US010300523B2

(12) United States Patent
Tanaka et al.

(10) Patent No.: US 10,300,523 B2
(45) Date of Patent: May 28, 2019

(54) CRANKSHAFT AND METHOD OF STRENGTHENING SHAFT COMPONENT

(71) Applicant: HONDA MOTOR CO., LTD., Tokyo (JP)

(72) Inventors: Toshiyuki Tanaka, Saitama (JP); Daisuke Miura, Utsunomiya (JP); Takuro Yoshimura, Utsunomiya (JP); Yutaka Takeuchi, Sakura (JP); Daisuke Koshino, Utsunomiya (JP)

(73) Assignee: HONDA MOTOR CO., LTD., Tokyo (JP)

(*) Notice: Subject to any disclaimer, the term of this patent is extended or adjusted under 35 U.S.C. 154(b) by 249 days.

(21) Appl. No.: 15/126,810

(22) PCT Filed: Mar. 16, 2015

(86) PCT No.: PCT/JP2015/057625
§ 371 (c)(1),
(2) Date: Sep. 16, 2016

(87) PCT Pub. No.: WO2015/141611
PCT Pub. Date: Sep. 24, 2015

(65) Prior Publication Data
US 2017/0165742 A1    Jun. 15, 2017

(30) Foreign Application Priority Data

Mar. 20, 2014  (JP) .................................. 2014-057830
Mar. 20, 2014  (JP) .................................. 2014-058041

(51) Int. Cl.
*B21D 3/16* (2006.01)
*B21K 1/08* (2006.01)
(Continued)

(52) U.S. Cl.
CPC .................. *B21K 1/08* (2013.01); *C21D 7/04* (2013.01); *C21D 9/30* (2013.01); *F02B 75/32* (2013.01); *F16C 3/08* (2013.01); *F16C 2202/06* (2013.01)

(58) Field of Classification Search
CPC .. B21K 1/08; F02B 75/32; C21D 9/30; C21D 7/04; F16C 3/08; F16C 2202/06
See application file for complete search history.

(56) References Cited

FOREIGN PATENT DOCUMENTS

GB          1442344       7/1976
JP       H06-024224 U    3/1994
(Continued)

OTHER PUBLICATIONS

Chinese Office Action with English Translation dated Jun. 5, 2018, 13 pages.
(Continued)

*Primary Examiner* — Jun S Yoo
(74) *Attorney, Agent, or Firm* — Rankin, Hill & Clark LLP (57) ABSTRACT

A crankshaft that can be strengthened in a short time without being subjected to wasteful processing, and that can be strengthened over a wide range. The crankshaft includes a crank pin and a fillet portion of a journal pin. Compressive residual stress is applied to a region on the fillet portion, which extends at almost equal distances to both sides in a circumferential direction from a portion in which the greatest bending load is applied, and a processing depth for applying the compressive residual stress is gradually decreased in a circumferential direction from the center position in which the compressive residual stress is greatest.

4 Claims, 4 Drawing Sheets

(51) Int. Cl.
  *F16C 3/08*   (2006.01)
  *C21D 7/04*   (2006.01)
  *C21D 9/30*   (2006.01)
  *F02B 75/32*  (2006.01)

(56) References Cited

FOREIGN PATENT DOCUMENTS

| | | |
|---|---|---|
| JP | 2004-243373 | 9/2004 |
| JP | 2005-321086 | 11/2005 |
| JP | 2010-203518 | 9/2010 |

OTHER PUBLICATIONS

Japanese Office Action with English Translation dated Aug. 30, 2017, 6 pages.
International Search Report, dated Jun. 16, 2015 (Jun. 16, 2015).

CRANKSHAFT AND METHOD OF STRENGTHENING SHAFT COMPONENT

TECHNICAL FIELD

The present invention relates to a crankshaft and to a method for strengthening a member having a shaft, and in particular, relates to a technique for strengthening to withstand bending load or torsional stress applied to a crank pin or a journal pin.

BACKGROUND ART

For example, a crankshaft has a journal pin and a crank pin, and a larger end portion of a connecting rod is rotatably supported at the crank pin, and the journal pin is rotatably supported at a journal bearing of an engine block. In order to avoid interference with a mated member, grooves in a cross-sectional semicircular shape (fillet portion) are formed at corner portions of the crank pin and the journal pin. The fillet portion is a portion having low strength, and a large bending moment is applied to the portion when there is an explosion in the internal combustion engine. Therefore, it is desired that a pin top portion (positions at 0 degrees phase and 180 degrees phase in the case of an inline four-cylinder engine) of in the fillet portion be strengthened.

As a strengthening method, a technique for strengthening using work hardening, in which a fillet portion is subjected to a plasticity processing by rotating a roll, is well known. However, the above strengthening method strengthens the entire circumference of the fillet portion, containing portions that do not require strengthening, and therefore, the time and effort for processing are uneconomical. Furthermore, the method simultaneously subjects the entire circumference of all fillet portions on the crank pins and the journal pins to plasticity processing, and as a result, the crankshaft is extended in a shaft direction and is bent.

Patent Publication 1 discloses a technique in which a crankshaft formed by hot forging is flatly placed on a lower die, and then a crank pin is partially subjected to cool coining by lowering an upper die. In this technique, protrusions are formed in each recess of the lower die and the upper die corresponding to the crank pin, and the fillet portion is subjected to a plasticity processing while holding it by the protrusions of the upper die and the lower die, and therefore, a crankshaft is strengthened in a short time.

Patent Publication 1 is Japanese Unexamined Patent Application Publication No. 2004-243373.

DISCLOSURE OF THE INVENTION

Problems Solved by the Invention

However, in the technique described in Patent Publication 1, since the fillet portion is subjected to plasticity processing while holding it by the protrusions, only a narrow portion in the vicinity of parting lines of the lower die and the upper die can be strengthened. In addition, tension residual stress is generated at a portion that adjoins the portion in which the compressive residual stress is applied by the plasticity processing, and a portion having low strength to bending moment is generated.

Therefore, an object of the present invention is to provide a crankshaft and a strengthening method of a shaft member, which can be strengthened in a short time without being subjected to wasteful processing, and which can be strengthened over a wide range. Furthermore, an object of the present invention is to provide a crankshaft and a strengthening method for a shaft member, in which the tension residual stress generated at a portion that adjoins the portion in which the compressive residual stress is applied, can be decreased by gradually applying the compressive residual stress from the portion required to be strengthened to a portion not required to be strengthened.

Means for Solving the Problems

A crankshaft of the present invention is characterized in that compressive residual stress is partially applied to a connected portion of a crank pin and a crank arm and/or a connected portion of a journal pin and a crank arm, the compressive residual stress is applied to a region on a portion in a cross-sectional circular shape of the crank pin and the journal pin that extends at almost equal distances to both sides in a circumferential direction from a portion in which bending load to be applied is greatest, and a processing depth for applying the compressive residual stress is gradually decreased in a circumferential direction from the center position in which the compressive residual stress is greatest.

According to the present invention, the compressive residual stress is applied to a region around a portion at which bending load to be applied is greatest, on a portion in a cross-sectional circular shape of the crank pin and the journal pin, and therefore, the greatest compressive residual stress can be applied to a wide range of the region in a short time. In addition, the present invention is economical since the compressive residual stress is applied only to the portion required to be strengthened. Furthermore, according to the present invention, extending in a shaft direction generated by the processing can be prevented by partially processing the crank pin and/or the journal pin.

In the present invention, the processing depth for applying the compressive residual stress is gradually decreased in a circumferential direction from the center position in which the compressive residual stress is greatest. That is, it is processed so as to have a processing margin in a crescent shape. According to the above processing, an amount of the compressive residual stress and the processing depth are maximized at the portion in which bending load to be applied is greatest, at the portion in a cross-sectional circular shape of the crank pin and the journal pin, and they gradually decrease in a circumferential direction from the portion, until the compressive residual stress is not applied. Therefore, the tension residual stress generated at a portion that adjoins the portion in which the compressive residual stress is applied can be decreased.

Here, in the present invention, the crank arm has a balance weight, and the portion at which bending load to be applied is greatest is a portion at a 180-degree opposite side to a comprised side of the balance weight on the connected portion of the crank pin and the crank arm, and is a portion at a comprised side of the balance weight on the connected portion of the journal pin and the crank arm.

Next, the present invention is a strengthening method for a shaft member having a portion in a cross-sectional circular shape, and it is characterized in that compressive residual stress is applied to a portion at the portion in a cross-sectional circular shape in which bending load and/or torsional stress to be applied in a circumferential direction is greatest during use of the shaft member, by pressing the portion in which bending load and/or torsional stress to be applied is greatest from a normal line direction using a pressing member.

According to the present invention, the portion in which bending load and/or torsional stress of the shaft member are greatest is pressed by the pressing member, and therefore, the greatest compressive residual stress can be applied to a wide range of the portion in a short time. In addition, the present invention is economical since the compressive residual stress is applied only to the portion required to be strengthened. Furthermore, according to the present invention, extending in a shaft direction generated by the plasticity processing can be prevented by partially subjecting the shaft member to the plasticity processing.

Here, it is desirable that the pressing member have a pressing surface that is an approximately cylindrical curved surface and that radius of curvature of the pressing surface be greater than that of the portion in a cross-sectional circular shape. When the portion in a cross-sectional circular shape of the shaft member is pressed by the pressing member, the portion in a cross-sectional circular shape is most deeply subjected to the plasticity processing at the circumferential center of the pressing surface, and the depth of the plasticity processing is gradually decreased in a circumference direction from the portion, until the plasticity processing is not applied. That is, it is processed so as to have a processing margin in a crescent shape.

According to the above plasticity processing, an amount of the compressive residual stress and the processing depth are maximized on a portion corresponding to the circumferential center of the pressing surface, on the portion in a cross-sectional circular shape, and they are gradually decreased in a circumferential direction from the portion, until the compressive residual stress is not applied. Therefore, the tension residual stress generated at a portion that adjoins the portion in which the compressive residual stress is applied can be decreased.

In the present invention, it is preferable that relief portions be formed at both sides in a circumferential direction of the pressing surface, that the relief portion be separated from the portion in a cross-sectional circular shape in a state in which the pressing surface presses the portion in a cross-sectional circular shape, and that the relief portion have an approximately circular arc shape when it is viewed from a side thereof. That is, the relief portion in an approximately circular arc shape when it is viewed from a side thereof is formed at both sides of the pressing surface, and the relief portion is gradually separated from a work piece in a circumferential direction at both sides of the processing margin in a crescent shape. Therefore, a pressing amount of the relief portion to the work piece is decreased at both sides of the processing margin in a crescent shape, processing of the material at both sides is decreased, and as a result, generation of the compressive residual stress can be prevented. That is, since the compressive residual stress is hardly applied at both sides of the processing margin in a crescent shape, the tension residual stress generated at a portion that adjoins the portion in which the compressive residual stress is applied can be decreased.

Moreover, in an aspect in which radius of curvature of the pressing surface is greater than that of the portion in a cross-sectional circular shape of the shaft member, as described above, a range, in which the portion in a cross-sectional circular shape of the shaft member is pressed by the pressing surface, is limited to only a part of an upper side thereof. Therefore, it is preferable that the pressing surface have a formed section and a gradual changing section, the formed section have an approximately cylindrical curved surface having radius of curvature which subtracts the pressing amount from radius of curvature of a cross-section of the shaft member, in a range within 45 degrees at both sides in a circumferential direction from a normal line direction, and that the gradual changing section have a diameter gradually increased to radius of curvature which adds a relief amount to radius of curvature of the shaft member, in a range within 90 degrees at both sides in a circumferential direction except for the formed section. In this aspect, since the radius of curvature of the formed section is less than that of the shaft member, a wider range (a range in which the greatest angle at one side is 45 degrees) can be strengthened.

In addition, since the gradual changing section has a diameter gradually increased to radius of curvature that adds a relief amount to radius of curvature of the shaft member, the compressive residual stress to be applied to the shaft member is gradually decreased on the gradual changing section, until the compressive residual stress is not applied. Therefore, the tension residual stress generated at a portion that adjoins the portion in which the compressive residual stress is applied can be decreased. Here, it is preferable that the formed section be a range of 30 to 45 degrees at both sides in a circumferential direction. Furthermore, it is preferable that the gradual changing section be a range of 60 to 75 degrees at both sides in a circumferential direction, except for the formed section.

The present invention can be used for freely selected shaft members having a portion in a cross-sectional circular shape, such as a crankshaft, a pulley shaft, a camshaft, etc. When the shaft member is a crankshaft, the portion in a cross-sectional circular shape is a crank pin and/or a journal pin with the grooves at both corners, the crankshaft is placed so as to orient the crank pin in a perpendicular direction, and the grooves are pressed from the perpendicular direction by the pressing member.

It is desirable that the pressing member have a shape that contacts with only the groove. As a result, the plasticity processing can be locally carried out on a portion required to be strengthened.

According to the strengthening method of the present invention, the crankshaft or the shaft member can be strengthened in a short time without being subjected to wasteful processing, and can be strengthened over a wide range. Furthermore, according to the present invention, the tension residual stress generated at a portion that adjoins a portion to be strengthened, can be decreased by gradually applying the compressive residual stress from a portion required to be strengthened to a portion not required to be strengthened.

PREFERRED EMBODIMENTS OF THE INVENTION

1. First Embodiment

Figure 1:
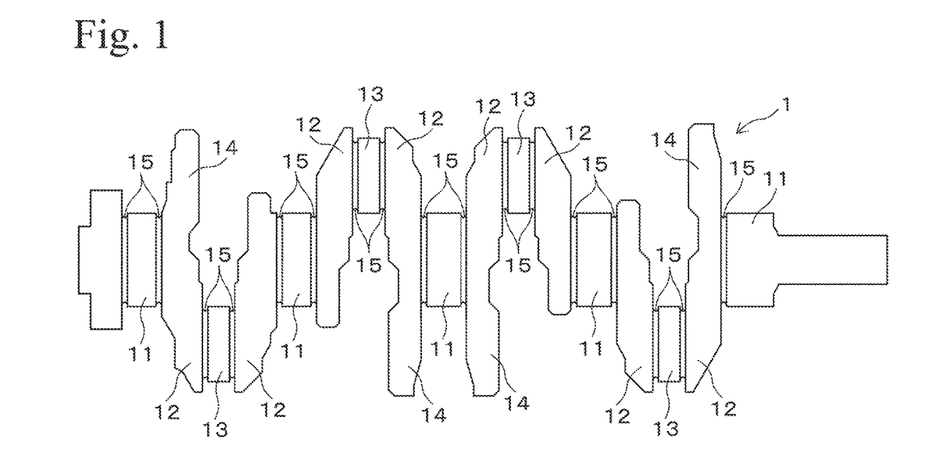
FIG. 1 is a side view showing a crankshaft of a first embodiment of the present invention.

In the following, a first embodiment of the present invention will be explained with reference to figures. FIG. 1 is a side view showing a crankshaft 1 according to the first embodiment of the present invention. The crankshaft 1 is formed by hot forging, and it has a structure in which crank arms 12 which protrude in a radial direction are formed on a journal pin 11 which is a rotating shaft, a crank pin 13 is bridged between edges of a pair of the crank arms 12, and a balance weight 14 is formed on another edge of a pair of the crank arms 12. At both corners of each journal pin 11 and each crank pin 13, fillet portions 15, which are grooves in a cross-sectional semicircle shape, are formed.

Figure 2:
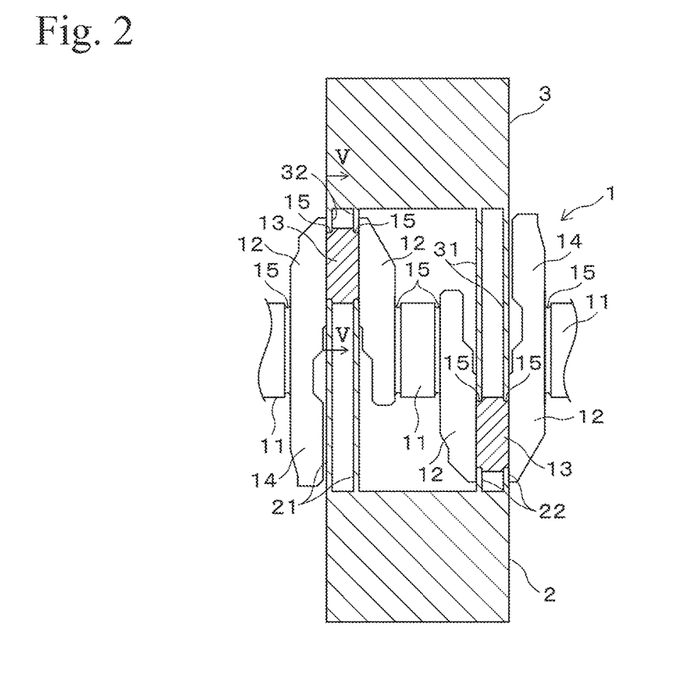
FIG. 2 is a side view showing a state for strengthening a crank pin in a first embodiment of the present invention.

FIG. 2 shows a state in which the fillet portions 15 of the crank pins 13 are subjected to plasticity processing by a lower die 2 and an upper die 3. The crankshaft 1 is carried on the die 2 so that the crank pins 13 are oriented in a perpendicular direction. At one side of the lower die 2, a pair of long first lower punches (pressing members) 21 that extend upwardly is formed. In contrast, at the other side of the lower die 2, a pair of short second lower punches (pressing members) 22 that extend upwardly is formed. Similarly, at one side of the upper die 3, a pair of long first upper punches (pressing members) 31 that extend downwardly is formed. In contrast, at the other side of the upper die 3, a pair of short second upper punches (pressing members) 32 that extend downwardly is formed.

Figure 3:
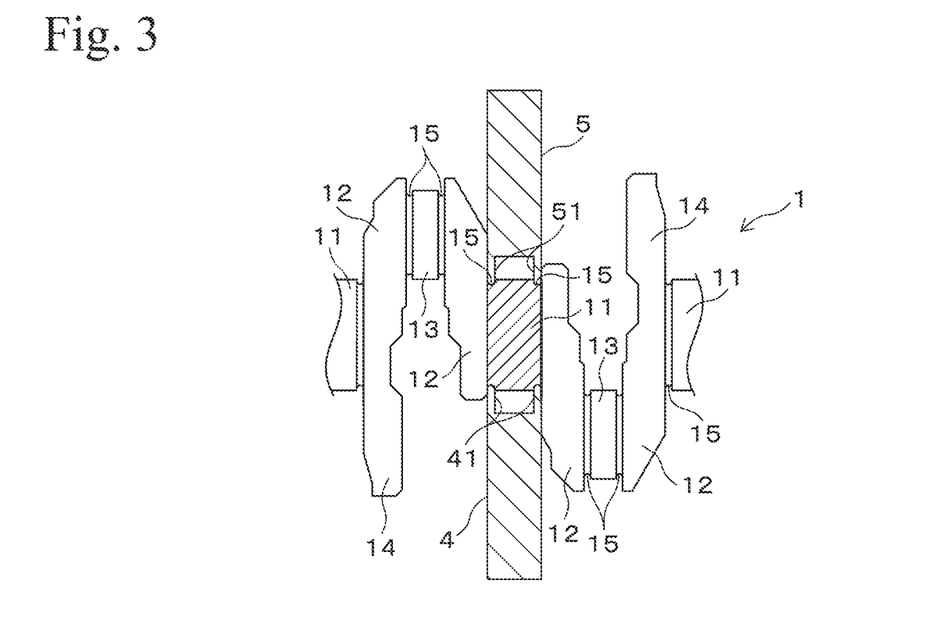
FIG. 3 is a side view showing a state for strengthening a journal pin in a first embodiment of the present invention.

FIG. 3 shows a state in which the fillet portions 15 of the journal pins 11 are subjected to plasticity processing by a lower die 4 and an upper die 5. On the lower die 4, a pair of short lower punches 41 that extend upwardly is formed. In contrast, on the upper die 5, a pair of short upper punches 51 that extend downwardly is formed.

Figure 4:
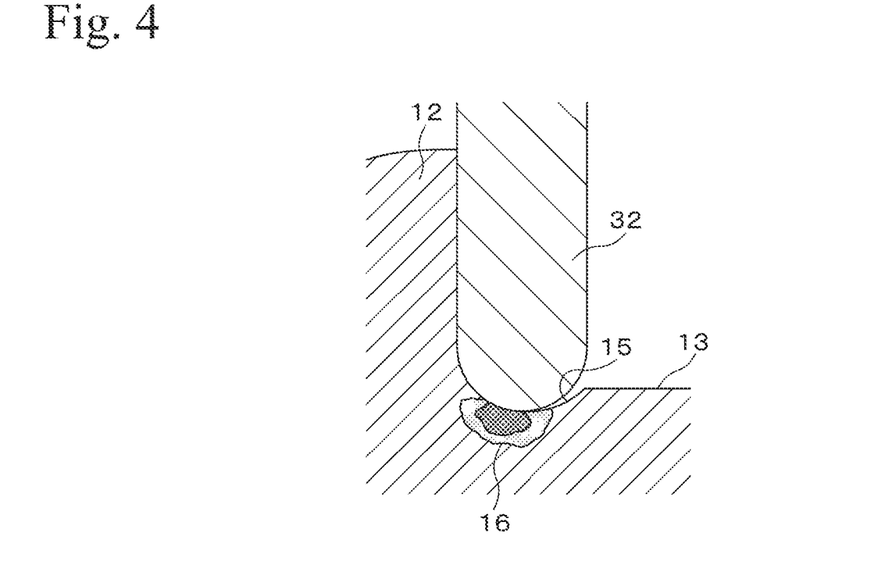
FIG. 4 is an enlarged side view showing a state for strengthening a crank pin in a first embodiment of the present invention.

FIG. 4 is a cross-sectional view showing the second upper punch 32 in detail. As shown in FIG. 4, the second upper punch 32 has a cross-sectional semicircle shape, and radius of curvature of the cross-section is set to be smaller than that of the fillet portion 15. Here, the first upper punch 31, the first lower punch 21, the second lower punch 22, the lower punch 41 and the upper punch 51 are also formed in the same manner as the second upper punch 32.

Figure 5:
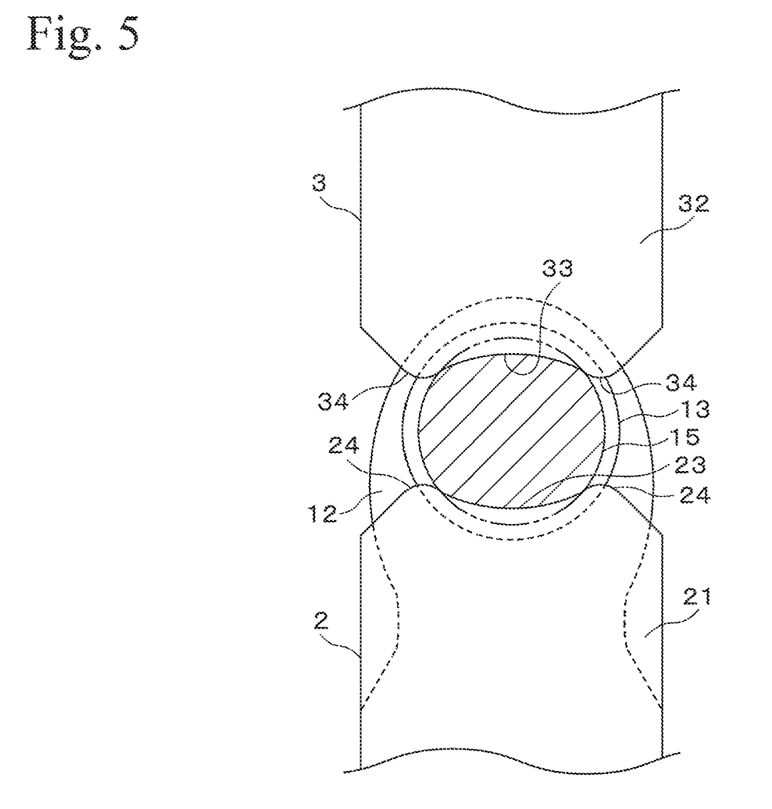
FIG. 5 is a cross-sectional view in an arrow direction illustrated by a V-V line in FIG. 2.

FIG. 5 shows a side-viewed shape of the first lower punch 21 and the second upper punch 32. On an upper surface of the first lower punch 21, a pressing surface 23, which is a cylindrical curved surface, is formed. Radius of curvature of the pressing surface 23 is set to be greater than that of the fillet portion 15. At both sides of the pressing surface 23, relief portions 24, which are cylindrical curved surfaces, are formed. Similarly, on a lower surface of the second upper punch 32, a pressing surface 33, which is a cylindrical curved surface, is formed.

Radius of curvature of the pressing surface 33 is set to be greater than that of the fillet portion 15. At both sides of the pressing surface 33, relief portions 34, which are cylindrical curved surfaces, are formed. Here, the first upper punch 31, the first lower punch 21, the second lower punch 22, the lower punch 41, and the upper punch 51 are also formed in the same manner as the first lower punch 21 and the second upper punch 32.

In the crankshaft 1 in the present embodiment, the fillet portion 15 is strengthened by plasticity processing at room temperature. In the following, a strengthening method for a crankshaft of the present embodiment will be explained. First, the crankshaft 1 is carried on the lower die 2. In this case, a crank pin 13 at a right end in FIG. 1 and a crank pin 13 at a left side thereof are carried on the lower die 2 so as to be oriented in a perpendicular direction. In addition, a suitable portion at a left edge of the crankshaft 1 can be supported by a spacer, etc.

When the upper die 3 is lowered in this state, the pressing surface 33 of the second upper punch 32 is contacted with the fillet portion 15 of the crank pin 13, and the fillet portion 15 is compressed by this pressing surface 33 and the pressing surface 23 of the first lower punch 21. The compressive residual stress 16 is applied to the fillet portion 15, as shown in FIG. 4, by this plasticity processing. The compressive residual stress 16 is large at a shallow portion from the surface of the fillet portion 15, and the greater the depth from the surface, the less the compressive residual stress 16. The tensile stress generated when bending moment is applied to the fillet portion 15 is cancelled by this compressive residual stress 16.

The fillet portion 15 is subjected to plasticity processing, so as to be formed to a crescent shape, as shown in FIG. 5, since the fillet portion 15 is processed by the pressing surface 23,33 having greater radius of curvature than that of the fillet portion 15. That is, the compressive residual stress is applied to a region on the fillet portion 15 which extends at almost equal distances to both sides in a circumferential direction from a portion in which bending load to be applied is greatest, and a processing depth for applying the compressive residual stress is gradually decreased in a circumferential direction from the center position in which the compressive residual stress is greatest.

The above crankshaft 1 is a crankshaft for an inline four-cylinder engine, and in this case, the greatest bending moment is applied to positions at 0 degree phase and 180 degrees phase, that is, the top point and the lowest point of the fillet portion in FIG. 5, when there is an explosion in the internal combustion engine. Specifically, in the case of the crank pin 13, the positions are positions of the fillet portion 15 which are located at 180 degrees opposite side to a direction of the balance weight 14. In the case of the journal pin 11, the positions are positions of the fillet portion 15 which are located in a direction of the balance weight 14.

In the above crankshaft 1, the portion of the fillet portion 15 in which bending load is the greatest is pressed by the second upper punch 32 and the first lower punch 21, and therefore, the greatest compressive residual stress can be applied to a wide range of the portion in a short time. In addition, the present invention is economical, since the compressive residual stress is applied to only the portion required to be strengthened. Furthermore, according to the present invention, extending in a shaft direction generated by the processing can be prevented by partially subjecting the fillet portion 15 to the plasticity processing.

In particular, in the above embodiment, the plasticity processing is carried out on a crescent shape, in which the top and the lowest point of the fillet portion 15 are the center, as shown in FIG. 5, and consequently, the greatest compressive residual stress is applied to a portion in which the greatest bending moment is applied, and the compressive residual stress is gradually decreased in a circumferential direction from the portion, until the compressive residual stress is not applied. Therefore, the tension residual stress generated at a portion that adjoins the portion in which the compressive residual stress is applied can be decreased. Such effect can reliably be obtained by processing using a structure in which the relief portions 24,34, which are cylindrical curved surfaces, are formed on the first lower punch 21 and the second upper punch 32.

That is, in the present embodiment, since the relief portions 24,34 which are cylindrical curved surfaces are formed at both sides of the pressing surfaces 23,33, the relief portions 24,34 are gradually separated in a circumferential direction from the fillet portion 15 at both sides of the processing margin in a crescent shape. Therefore, a pressing amount of the relief portions 24,34 to the fillet portion 15 is decreased at both sides (point P shown in FIG. 6) of the processing margin in a crescent shape, processing of the material at both sides is decreased, and as a result, the tension residual stress generated at a portion that adjoins the portion in which the compressive residual stress is applied, can be decreased.

Figure 6:
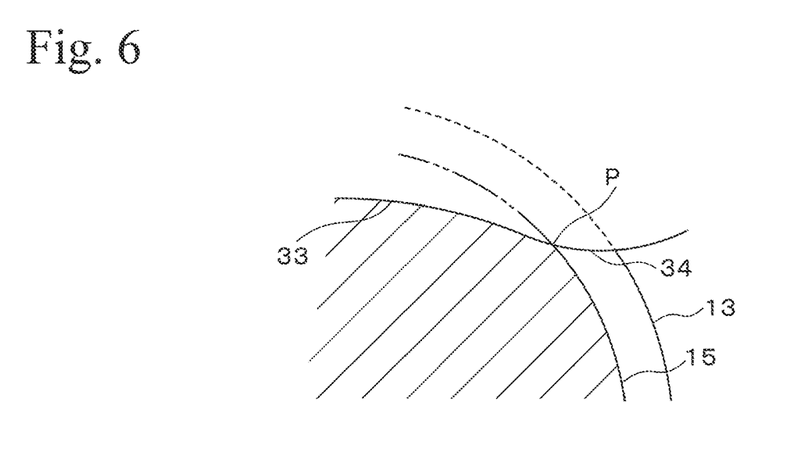
FIG. 6 is an enlarged view showing an edge of a processing portion in a crescent shape in detail.

The point P of the processing margin in a crescent shape is bent outwardly in a radial direction, as shown in FIG. 6, and the processing to the fillet portion 15 is reduced according to this bent region. That is, since the compressive residual stress is hardly applied to the points P at both sides of the processing margin in a crescent shape, the tension residual stress generated at a portion that adjoins the portion in which the compressive residual stress is applied can be decreased.

Next, the crankshaft 1 is turned upside down, the crank pin 13 at a left end and the crank pin 13 at a right side thereof are carried on the lower die 2 oriented in a perpendicular direction, and the fillet portion 15 is subjected to plasticity processing in the same manner as the above process. The plasticity processing is carried out on the fillet portion 15 of the journal pin 11 by the lower die 4 and the upper die 5 shown in FIG. 3. Also on the fillet portions 15 of the crank pin 13 and the journal pin 11 subjected to the plasticity processing as described above, the same working and effect can be obtained.

The above embodiment is one example in which the present invention is applied to a crankshaft without a fillet portion. However, the above working and effect can be obtained, even if the present invention is applied to a crankshaft without a fillet portion. Additionally, the present invention is not limited to a crankshaft 1 for an inline four-cylinder engine as described above, and it can be applied to a crankshaft for a V-type engine, etc.

Here, in the above embodiment, two crank pins 13 are strengthened by a plurality of upper and lower punches 21,22,31,33, as shown in FIG. 2, and each of the crank pins 13 may be strengthened by a pair of the upper and lower punches, respectively. Alternatively, all of the crank pins 13 and all of the journal pins 11 may be strengthened at one time using assembled dies. However, extending in a shaft direction is caused, when the crank pins 13 and the journal pins 11 are processed by the upper and lower punches. As a result, deformation such as bending of a pin, tilting of a balance weight 13, etc., often results on the crankshaft due to the extending in a shaft direction, when multiple positions or all positions on the crank pins 13 and the journal pins 11 are processed at one time. Therefore, it is desirable that the crank pins 13 and the journal pins 11 be processed at every position, in order to avoid such deformation.

The above embodiment is one example in which the present invention is applied to a crankshaft. However, the present invention can be applied to various shaft members in a cross-sectional circular shape such as a pulley shaft, a camshaft, etc.

2. Second Embodiment

Figure 7:
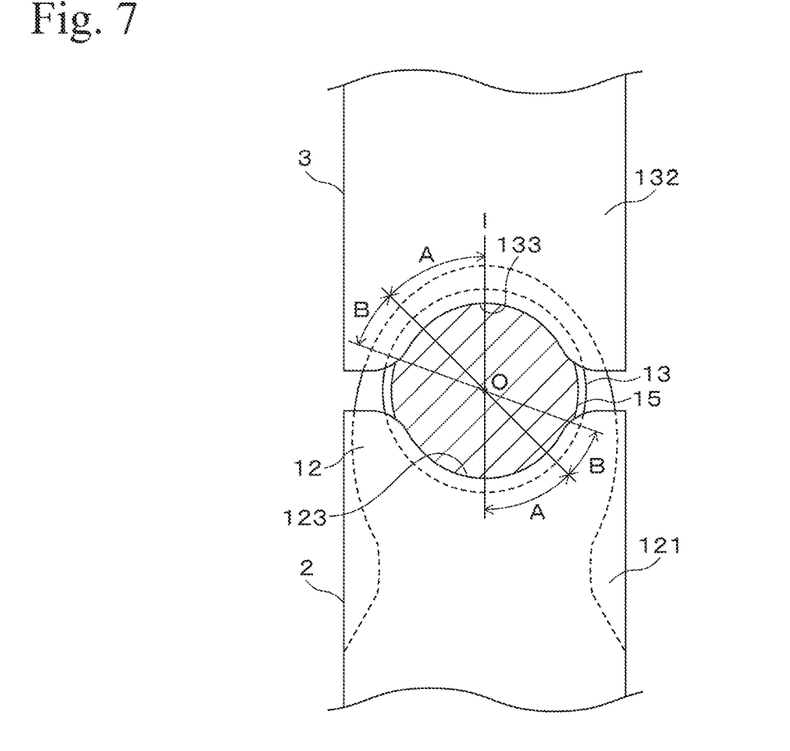
FIG. 7 is a cross-sectional view in an arrow direction illustrated by a V-V line in FIG. 2 showing a method for strengthening a shaft member of a second embodiment of the present invention.

A second embodiment of the present invention will be explained with reference to FIGS. 7 and 8. FIG. 7 is a perspective side view showing a first lower punch 121 and a second upper punch 132. A pressing surface 133 is formed on an underside of the second upper punch 132. The pressing surface 133 has a formed section A in a range within 45 degrees at both sides in a circumferential direction from a normal line I direction (a direction from the center of curvature O to a center line of the second upper punch 132), which is an approximately cylindrical curved surface having radius of curvature which subtracts a pressing amount from radius of curvature of a cross-section of a fillet portion 15. Here, "the pressing amount" means a thickness in which the fillet portion 15 is processed along the normal line I by the pressing surface 133. The formed section A is almost equally processed by the pressing surface 133.

Figure 8:
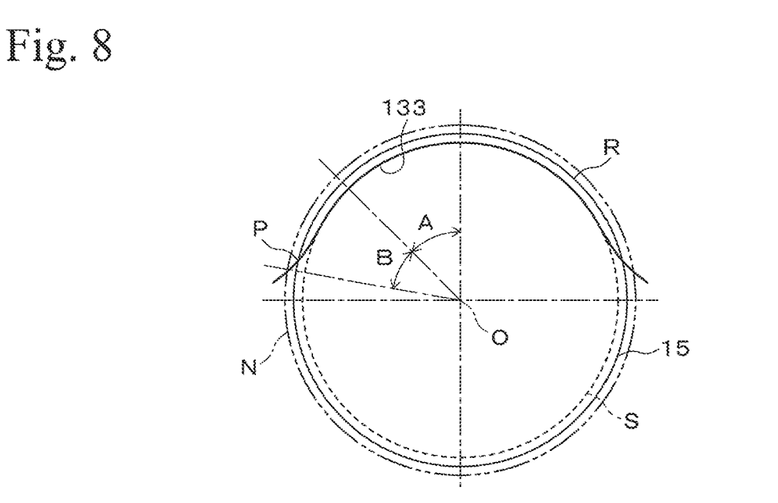
FIG. 8 is an enlarged view showing a processing portion in detail.

As shown in FIG. 8, the pressing surface 133 has a gradual changing section B in a range within 90 degrees at both sides in a circumferential direction except for the formed section A, which has a diameter gradually increased to a relief diameter N which adds a relief amount to radius of curvature of the fillet portion 15. In FIG. 8, a solid line denotes a diameter R of the fillet portion 15, a broken line denotes a formed diameter S after forming (a diameter of the fillet portion 15 minus the pressing amount), and a dashed line denotes a relief diameter N (a diameter of the fillet portion 15 plus the relief amount). A shape of the gradual changing section B is set by setting distances between the center of curvature O and each angle point, so as to form a cam profile around the center of curvature O.

Specifically, angles of the formed section A and the gradual changing section B are measured, and points are determined by setting diameters at every 10 degrees from an endpoint of the formed section A. In this case, the number of points is calculated by dividing the angle of the gradual changing section B by 10 degrees, and a difference of the relief diameter N and the formed diameter S is calculated. Then, the difference in diameters is divided by the number of points, and then, the diameter is increased at every 10 degrees by the result. Therefore, the distance from the center of curvature O is gradually increased in a circumferential direction except for the formed section A, and it is increased to be the same as a diameter R of the fillet portion 15 at a point P, and moreover, it protrudes in an opposite direction to the formed section A and reaches to the relief diameter N, when it is further increased in a circumferential direction.

The first lower punch 121 has also a similar structure to that of the second upper punch 132. That is, a pressing surface 123 is formed on an upper surface of the first lower punch 121, and the pressing surface 123 has a formed section A in a range within 45 degrees at both sides in a circumferential direction from a normal line I direction, which is an approximately cylindrical curved surface having radius of curvature which subtracts a pressing amount from radius of curvature of a cross-section of a fillet portion 15. In addition, the pressing surface 123 has a gradual changing section B in a range within 90 degrees at both sides in a circumferential direction except for the formed section A, which has a diameter gradually increasing to radius of curvature which adds a relief amount to radius of curvature of the fillet portion 15.

A method for strengthening the fillet portion 15 by the first lower punch 121 and the second upper punch 132 having the above structure will be explained. The formed section A on the pressing surface 133 of the second upper punch 132 is contacted with the fillet portion 15 of a crank pin 13 by lowering an upper die 3, and the fillet portion 15 is processed by this formed section A and a formed section A on the pressing surface 123 of the first lower punch 121. The compressive residual stress is applied to the fillet portion 15 by this processing. The formed section A of the fillet portion 15 is formed only within the pressing amount in a perpendicular direction substantially all over, and therefore, the compressive residual stress is almost uniform on the formed section A. Then, tensile stress generated when bending moment is applied to the fillet portion 15 is cancelled by this compressive residual stress.

In contrast, on the gradual changing section B, the processing amount is gradually decreased in a circumferential direction, and then, a portion that has not been processed finally results. That is, the compressive residual stress applied to the fillet portion 15 is gradually decreased on the gradual changing section B until it is not applied. Therefore, tension residual stress generated at a portion that adjoins a portion in which the compressive residual stress is applied can be decreased.

The present invention can be applied to strengthening of freely selected shaft members with a portion in a cross-sectional circular shape such as a crankshaft, a pulley shaft, a camshaft, etc.

EXPLANATION OF REFERENCE SYMBOLS

1 . . . crankshaft, 2 . . . lower die, 3 . . . upper die, 4 . . . lower die, 5 . . . upper die, 11 . . . journal pin, 12 . . . crank arm, 13 . . . crank pin, 14 . . . balance weight, 15 . . . fillet portion, 21 . . . first lower punch (pressing member), 22 . . . second lower punch (pressing member), 23 . . . pressing surface, 24 . . . relief portion, 31 . . . first upper punch (pressing member), 32 . . . second upper punch (pressing member), 33 . . . pressing surface, 34 . . . relief portion, 41 . . . lower punch, 51 . . . upper punch, 121 . . . first lower punch (pressing member), 123 . . . pressing surface, 132 . . . second upper punch (pressing member), 133 . . . pressing surface.

The invention claimed is:

1. A strengthening method for a shaft member having a cross-sectional circular shape portion, wherein compressive residual stress is applied to a portion on the cross-sectional circular shape portion in which bending load and/or torsional stress to be applied in a circumferential direction is greatest during use of the shaft member, by pressing said portion from a normal line direction using a pressing member having a pressing surface comprising an approximately cylindrical curved surface, and which has radius of curvature greater than that of the cross-sectional circular shape portion, wherein relief portions are formed at both sides in a circumferential direction of the pressing surface, the relief portions have an approximately circular arc shape when viewed in an axial direction of the cross-sectional circular shape portion while the pressing surface presses the portion, the relief portions project toward an opposite direction with respect to a concave direction of the pressing surface, the relief portions are gradually separated in a radial direction from the portion toward the circumferential direction while the pressing surface presses the portion, and the compressive residual stress in the relief portions is decreased in a state in which the pressing surface presses the portion.

2. The strengthening method for a shaft member according to claim 1, wherein the pressing surface comprises a formed section and a gradual changing section, the formed section has the approximately cylindrical curved surface having radius of curvature which subtracts the pressing amount from radius of curvature of a cross-section of the shaft member, in a range within 45 degrees at both sides in the circumferential direction from a normal line direction, and the gradual changing section has a diameter gradually increased to radius of curvature which adds a relief amount to radius of curvature of the shaft member, in a range within 90 degrees at both sides in the circumferential direction, except for the formed section, and the shaft member is processed at a desired pressing amount by the pressing surface.

3. The strengthening method for a shaft member according to claim 2, wherein the shaft member is a crankshaft, the portion of the shaft member in the cross-sectional circular shape is a crank pin or a journal pin with grooves at both corners, the crankshaft is placed so as to orient the crank pin or the journal pin in a perpendicular direction, and the grooves are pressed from the perpendicular direction by the pressing member.

4. The strengthening method for a shaft member according to claim 1, wherein an inflection point exists at a boundary of the pressing surface and the relief portion in a processing margin of the pressing member when viewed from the side in the axial direction of the shaft member while the pressing surface presses the portion.

* * * * *